United States Patent
Chang et al.

(10) Patent No.: US 6,396,942 B1
(45) Date of Patent: May 28, 2002

(54) METHOD AND APPARATUS FOR LOCATING BALL GRID ARRAY PACKAGES FROM TWO-DIMENSIONAL IMAGE DATA

(75) Inventors: Yian Leng Chang, Sudbury; Nigel John Foster, Newton; Jane Alice Loizeaux, Lowell, all of MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/568,374

(22) Filed: May 10, 2000

Related U.S. Application Data

(63) Continuation of application No. 08/947,760, filed on Oct. 9, 1997.

(51) Int. Cl.$^7$ .............................................. G06K 9/00
(52) U.S. Cl. ..................... 382/141; 282/147; 282/150; 282/151; 282/296; 348/87; 348/94; 348/126; 356/237.4; 356/388; 356/395; 356/398
(58) Field of Search ............................... 382/296, 147, 382/146, 154, 149, 150, 151; 250/559.44, 559.23, 308; 348/87, 94, 95, 126; 356/398, 237.4, 388, 395, 151

(56) References Cited

U.S. PATENT DOCUMENTS

| | | | |
|---|---|---|---|
| 5,446,960 A | 9/1995 | Isaacs et al. | 29/834 |
| 5,465,152 A | 11/1995 | Bilodeau et al. | 356/602 |
| 5,550,763 A | 8/1996 | Michael et al. | 702/155 |
| 5,574,668 A | 11/1996 | Beaty | 702/150 |
| 5,574,801 A | 11/1996 | Collet-Beillon | 382/150 |

(List continued on next page.)

FOREIGN PATENT DOCUMENTS

WO    WO 95/11519    4/1995

OTHER PUBLICATIONS

Deley et al., "Accurate Placement of Ball Grid Array Packages," reprinted from *Electronic Packaging & Production*, Apr. 1996, Cahners Publishing Company, Newton, MA, USA.

Cognex Corporation, "Chapter 11 Ball Grid Array Device Inspection," *SMD Placement Guidance Product User's Manual*, 1996, pp. 213–246, Release 2.3.00 590–1039, Natick, MA.

(List continued on next page.)

*Primary Examiner*—Leo Boudreau
*Assistant Examiner*—Sheela Chawan
(74) *Attorney, Agent, or Firm*—Brian Michaelis

(57) ABSTRACT

A ball grid array inspection and location method and apparatus includes a raw feature finding processor which uses a feature finding algorithm to find ball features (irrespective of number) and generate a list of raw features as an X and Y location for each feature located. An angle estimation processor receives the list of raw features, a user estimated orientation angle, and ball-to-ball pitch information and determines an estimated grid angle. An on-grid check processor receives the estimated grid angle, the list of raw features and the ball-to-ball pitch information and produces a set or list of on-grid features in the form of a list X and Y translation parameters for each feature/ball found on-grid. A correspondence processor receives the list of on-grid features and model grid information and searches for correspondence between the two dimensional array of found grid features and the two dimensional array of model grid features to yield a direct mapping of respective two dimensional spatial relationships between model features and found features, which is used to determine the spatial relationship between model space and physical space in order to position/align balls of the device in physical space in accordance with model balls in model space. A least square fit is effected to refine position of the device in terms of its translation and rotation.

6 Claims, 12 Drawing Sheets

U.S. PATENT DOCUMENTS

| | | | | |
|---|---|---|---|---|
| 5,621,530 A | | 4/1997 | Marrable, Jr. | 356/394 |
| 5,652,658 A | | 6/1997 | Jackson et al. | 356/398 |
| 5,656,402 A | | 8/1997 | Kasuga | 430/22 |
| 5,682,242 A | | 10/1997 | Eylon | 356/401 |
| 5,694,482 A | * | 12/1997 | Maali et al. | 382/151 |
| 5,713,666 A | | 2/1998 | Seelin et al. | 374/126 |
| 5,796,590 A | | 8/1998 | Klein | 361/774 |

OTHER PUBLICATIONS

ICOS Vision Systmes, Inc., "ICOS 2–Dimension BGA Inspection System," specification sheet, pp. 1–6, Waltham, MA USA.

ICOS Vision Systems, Inc., "ICOS Component Checker for BGA Inspection," specification sheet, Waltham, MA USA.

Caracappa, Ed., "On Improving BGA Reliability and Quality," *Surface Mount Technology Magazine*, Jun. 1997, pp. 44–46, Libertyville, IL, USA.

Groen, et al., "Symbol recognition in electrical diagrams using probabilistic graph matching," *Pattern Recognition Letters* 3, Sep. 1985, pp. 343–350, Elsevier Science Publishers, B.V. North Holland.

* cited by examiner

REGULAR    CHECKER    REVERSE CHECKER

× GRID POINT (IE. BALL)

× : ON-GRID FEATURES
● : NOISE FEATURES
t : TOLERANCE (ALL FEATURES FALL WITHIN THE SAME t ARE MERGED)
P : COMPUTED PITCH

MODEL GRID
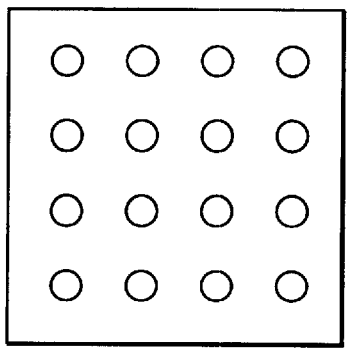
FIG. 8A
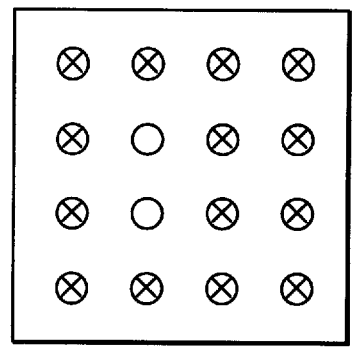
⊗ ⇒ CORRESPONDENCE
C = 14
FOUND GRID
FIG. 8B
FIG. 8C
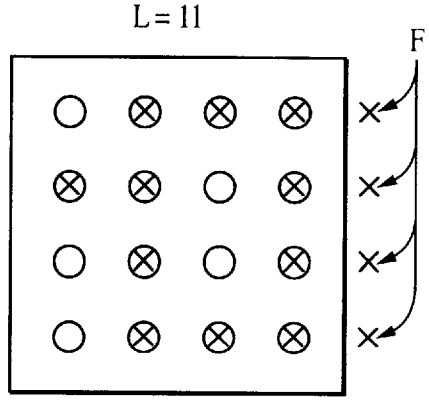
⊗ ⇒ CORRESPONDENCE
L = 11
FIG. 8D × × × × ×
× ×   × ×
  ×   × ×
× × × × ×
FOUND GRID
FIG. 8E
⊗ ⇒ CORRESPONDENCE
C = 14
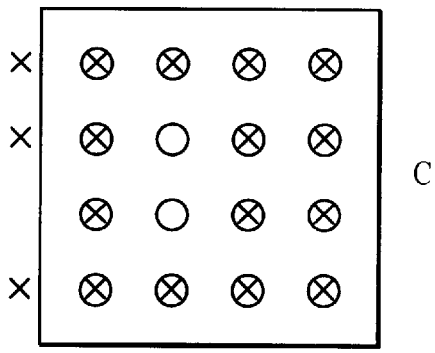
FIG. 8F
⊗ ⇒ CORRESPONDENCE
L = 13
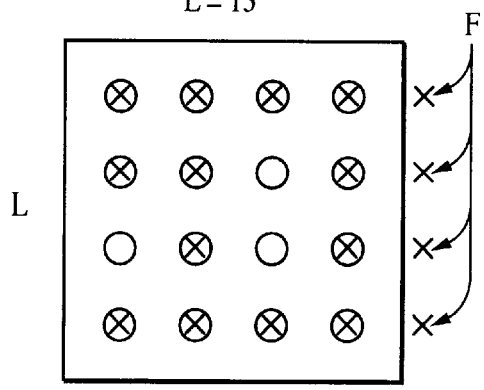
FIG. 8G

METHOD AND APPARATUS FOR LOCATING BALL GRID ARRAY PACKAGES FROM TWO-DIMENSIONAL IMAGE DATA

This Appln is a con't of Ser. No. 08/947,760 filed Oct. 9, 1997.

FIELD OF THE INVENTION

The present invention relates to locating and inspecting electronic components using machine vision systems, and more particularly to locating and inspecting surface mount packaged electronic components.

BACKGROUND OF THE INVENTION

Machine vision systems are frequently used in contexts that require the system to capture a two dimensional image of a physical object and locate within that image some aspects or features that are to be analyzed, to determine position of the features and effect alignment or a particular orientation of the physical object. In such contexts, vision systems are typically implemented in conjunction with "pick-and-place" machinery that physically manipulates or picks up the physical object, moves the object past a camera of the vision system which captures the two dimensional image, and places the object in accordance with computations that determine the proper X, Y translation and rotation of the object.

Known systems employ what may be referred to as "feature based" methods which locate features, such as component leads or interconnects of an electronic device, within the captured image of the object to determine a current position and/or effect alignment of the electronic device. Current position and/or alignment of the electronic device being manipulated or inspected is effected in "physical space", which is an absolute coordinate frame within which the object actually resides.

Current position and/or alignment of the electronic device in "physical space" is effected based on a model of the electronic device, i.e. standard of the physical object. Accordingly, implementation of feature based methods typically requires as an input to the vision system a set of model features acquired from the model, in accordance with an arbitrary coordinate system or "model space".

An image of the electronic device and its relevant features is acquired by the vision system, in accordance with an "image space" coordinate system, as the device is manipulated by the pick-and-place machinery. The acquired or captured image provides a set of image features (analogous to physical features) which are input to the vision system. The image is typically input as point information relative to the image space coordinate system. Knowing the two dimensional linear mapping between physical space and image space, the set of model features and the set of image features can be processed according to known algorithms to determine "correspondence", i.e. a direct mapping of respective two dimensional spatial relationships, between model features and image features. Correspondence between model and image features, or equivalently, a two dimensional rigid transform that maps model features to their corresponding features in image space can then be used, knowing the two dimensional linear mapping between physical space and image space, to determine the spatial relationship between model space and physical space in order to position/align features of the object in physical space in accordance with model features in model space.

The practical realities of implementing vision systems with feature based methods used to locate features, such as component leads or interconnects of an electronic device, dictates that appropriate algorithms be designed and optimized for location/inspection of selected features. The efficacy of the system implemented requires that the appropriate algorithms take into consideration variables associated with the type or kind of features upon which correspondence will be based. Similarly the efficacy of the system requires that the appropriate algorithms take into consideration the physical background on which the selected features are located, among other things.

U.S. patent application Ser. No. 08/816,279 entitled METHOD AND APPARATUS FOR LOCATING AND INSPECTING A TWO DIMENSIONAL IMAGE INCLUDING CO-LINEAR FEATURES ("the '279 application"), filed on Mar. 13, 1997, the teachings of which are incorporated herein by reference, discloses a method and apparatus that optimizes the process of locating/aligning electronic components based on at least one set of regularly spaced co-linear features. In this process for aligning/locating surface mount electronic devices ("SMD"), a selected set of regularly spaced co-linear SMD component leads is used to quickly correlate a set of image points and a set of model points which are likely to correspond to each other. A one-to-one correspondence of a plurality of model points to a plurality of image points yields a single possible location for the object/device in the image, based on the image set to model set correspondence. The single possible location is checked for correctness, and if incorrect, a next possible set to set correspondence is tested until the correct location is found.

In the implementation in the '279 application, a model is preprocessed to determine all sets of co-linear model features. An image feature finder, tailored or selected to find the specific type of component lead features, is implemented to extract information relating to component lead features in the image. A co-linear feature finding process finds lines of regularly spaced co-linear image features by identifying all groups of three points, testing each group of three points for co-linearity and frequency in accordance with the geometry of the model, and testing all other image features for membership in established lines based on co-linearity and frequency. A position hypothesis generator iteratively tests image line feature information against all possible model sets (i.e. lines of features) that it might match to establish one-to-one correspondence, which indicates that each feature of the set of co-linear image features is spatially correlated to or aligned with each feature of a set of co-linear features in the model. Two dimensional rigid transforms are used to effect a respective hypothesized position image for each set correspondence. Each hypothesized position image is passed to a verification process which tests the hypothesized position image against the captured image to see if it is a correct hypothesis, i.e. if all of the image features are present and in their proper locations.

The implementation of the '279 application is optimized for processing a particular type of electronic device(s). More specifically, the '279 application provides a high speed mechanism for inspecting and positioning surface mount electronic devices having at least one set of co-linear leads. The efficacy of the various elements of the implementation in the '279 application is limited in applications that are not suited to processing information relating to sets of co-linear leads.

Implementations are known for inspecting/locating electronic components based on other than sets of regularly spaced co-linear surface mount leads. An implementation known in the art for using vision systems to inspect/locate Ball Grid Array surface mount devices is disclosed in ACCURATE PLACEMENT OF BALL GRID ARRAY PACKAGES, Deley, M. Ramsey, C. C., Quad Systems Corp., Electronic Packaging & Production, April 1996. Ball Grid Array devices (BGA) are surface mount devices in a package having an exterior mounting surface that consists of a set of solder balls arranged in a grid pattern. The solder balls, when appropriately positioned and subjected to appropriate temperatures, effect interconnections for attaching the BGA device to other electronic components, such as Printed Circuit Boards (PCBs).

To automatically align and place BGA devices on a printed circuit board, an automated vision system is used in a pick-and-place machine to determine the X, Y translations and rotation of the device with respect to a fixed reference point on a mounter of the pick-and-place machine. The referenced known BGA implementation finds the global position and orientation of the ball grid based on five balls located in each corner of the grid. The accurate position of all the balls is then determined by an extended attribute tree search.

The success of this known approach relies on the corner balls being located correctly. Locating selected balls in a grid of balls is not always an easy task to accomplish. Variability in lighting conditions leads to difficulty in discriminating balls from noise, such as may be created by reflected light, shadowing or the like in an image. Under less-than-adequate lighting, a ball can easily be missed. Similarly, pattern printing as is commonly found on the edges of a device body can confuse a feature locator into finding noise features instead of actual balls. Furthermore, given that ball grids on BGAs are of varying patterns, this known method may not work very well on devices with sparsely populated corners.

SUMMARY OF THE INVENTION

The present invention provides a method and apparatus for locating and inspecting BGA devices based on detecting the solder ball features in a two-dimensional digital image irrespective of the grid arrangement of the balls, irrespective of the number of balls, and irrespective of dimensional uniformity of the balls.

According to the invention, the ball grid array inspection and location method and apparatus includes a raw feature finding processor or feature finder which receives as inputs: model information in the form of a device description; captured image information in the form of a two dimensional image of the device (in image space) being inspected/located by a vision system working in conjunction with pick and place machinery; and calibration information comprising a two dimensional transform relating image space to physical space. The raw feature finding processor uses a feature finding algorithm such as a Hough transform or Cognex Blob Tool to find ball features (irrespective of number) and generate a list of raw features (in physical space) in the form of an X and Y location for each feature located.

An angle estimation processor receives the list of raw features from the raw feature finding processor and as additional inputs a user estimated orientation angle (i.e. a user supplied approximation of the rotation of the physical ball grid from a model position), and ball-to-ball pitch information from the model device description. The angle estimation process determines an estimated grid angle, i.e. a rough estimation of an orientation angle of the grid in physical space. In determining the estimated grid angle, the angle estimation processor generates projection data in the form of projections of a plurality of histograms representative of data points corresponding to lines of balls at multiple candidate angles. From the plurality of projections/histograms, the highest density peak projection is selected as indicative of the estimated grid angle.

An on-grid check processor receives the estimated grid angle, the list of raw features and the ball-to-ball pitch information and in effect superimposes a grid on the found features in order to eliminate noise features, merge features that were found in slightly different locations in multiple fields of view, and to verify/refine the estimated grid angle. The on-grid check processor produces a set or list of on-grid features in the form of a list of X and Y translation parameters for each feature/ball found on-grid.

A correspondence processor receives the list of on-grid features and model grid information (i.e. from the model device description) and searches for correspondence between the two dimensional array of found grid features and the two dimensional array of model grid features. The correspondence processor yields a direct mapping of respective two dimensional spatial relationships between model features or balls and found image features or balls. Correspondence between model balls and image balls, or equivalently, a two dimensional rigid transform that maps model balls to corresponding balls in image space can then be used, knowing the two dimensional linear mapping between physical space and image space, to determine the spatial relationship between model space and physical space in order to position/align balls of the device in physical space in accordance with is model balls in model space.

A least square final fit is effected as a fine alignment to refine the position of the device in terms of its translation and rotation. A minimum square error transformation is used in the least square fit to provide a more accurate actual device location. The device location can then be manipulated by pick and place hardware in order to place the device in its proper location/destination, e.g. for assembly on a PCB.

Features of the invention include provision of a BGA locating implementation that can be applied to virtually any BGA devices with a grid arrangement of balls, even if the grid is sparse, incomplete, or disconnected. The method and apparatus according to the invention is highly effective even under variable lighting conditions, and even under lighting conditions that do not allow all the balls in a grid to be detected. The feature locator implemented does not require balls to appear perfectly circular in an image, nor do they need to be identical to each other in size and brightness in order to facilitate location. A minimum workable ball size for purposes of detecting a ball feature is 3 pixels in diameter. Both bright and dark features can be located, hence white body ceramic, yellow body TAB (tape automated bonding) and dark body plastic BGA devices can all be inspected with the method and apparatus according to the invention. The mechanisms in the implementation according to the present invention enable inspection which tolerates moderate amounts of noise, including noise from circuit traces or other printed patterns on the device body.

BRIEF DESCRIPTION OF THE DRAWING

The foregoing and other features and advantages of the present invention will be more fully understood from the following detailed description of illustrative embodiments, taken in conjunction with the accompanying drawing in which:

FIGS. 8A–8G illustrate local validity checking of correspondence between a model grid and a found grid.

DETAILED DESCRIPTION OF THE INVENTION

The present method and apparatus for inspecting and locating a ball grid array within a two dimensional image is illustratively implemented in the context of electronic component handling systems. In fabricating electronic assemblies, surface mountable ball grid array (BGA) devices must be accurately positioned on corresponding lands or pads on a printed circuit board (PCB). The balls in the grid constitute terminals which are often fine pitch, i.e. closely spaced, typically in a two dimensional array. As with other fine pitch leaded surface mount devices (SMDs), there is little margin for error in positioning such devices on the PCB during assembly.

Figure 1:
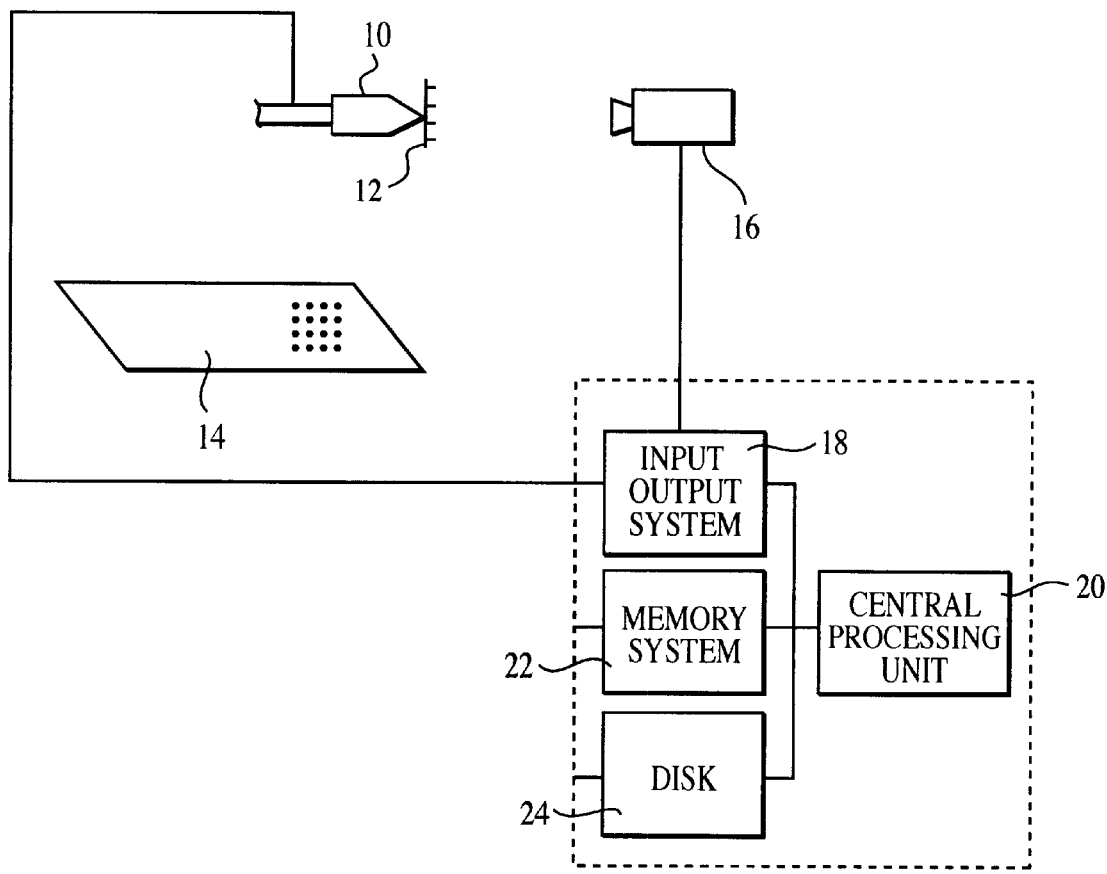
FIG. 1 depicts an illustrative machine vision system for practicing the invention.

As generally illustrated in FIG. 1, pick and place machines are used to manipulate the BGAs into position on the PCBs for automated assembly. Pick and place machinery typically comprises a robotic mounter configured to handle electronic components (e.g. integrated circuits, capacitors, large leaded devices, etc.). The robotic mounter/pick and place machinery is integrated with a "vision system" which acquires information related to the component as it is handled by the mounter. Generally, the mounter includes an arm or nozzle 10 that picks up the electronic component(s) 12 from a feeder for placement on the PCB 14 at a designated location. As it is placing each component, the arm passes the component over image acquisition components of the system, i.e. a camera 16 and an image of the component is acquired for the vision system. The captured image, in the form of digital data representing image picture element (pixel) intensity, in a conventional manner, is transmitted to the vision system for image analysis.

Image analysis is conventionally performed in the system by integrated facilities comprising an input/output system 18 receiving the captured image, one or more central processing units (CPUs) 20 processing data such as according to the present invention, and memory 22 and mass storage 24 (such as one or more disk drives) for storage and manipulation of the data. The vision system is configured to provide feedback to the robotic mounter as to the exact position of the component 12 on the mounter nozzle 10, so that the mounter can perform fine positional adjustments before placing the component 12 on the PCB 14.

The components 12 handled by pick and place machines typically have a plurality of features that must be aligned, and a set or some subset of those features, such as a grid or array of solder balls providing interconnects, can be used to facilitate the positioning process. The vision system in this illustrative embodiment, for example a Cognex 5000 Series vision system and vision tools known in the art, is implemented to locate the set or subset of balls in the grid array, in a two dimensional image of the component that is captured, as known in the art, when the component is passed over image acquisition components of the vision system. The balls or features in the captured image are used according to the invention as generally illustrated in FIGS. 1 and 3, in determining positional adjustments for properly positioning the component 12 on the PCB 14.

Figure 2A:
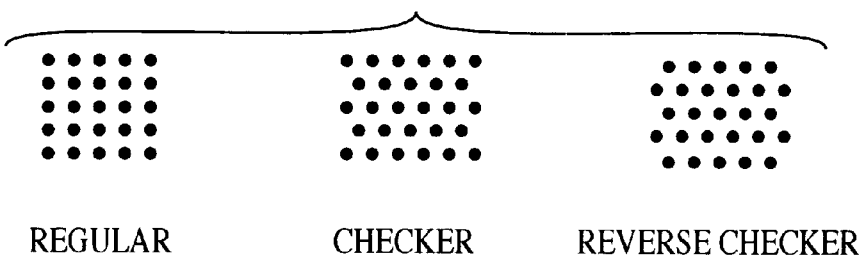
FIG. 2A illustrates several grid types that are processed by the method and apparatus for locating and inspecting a two dimensional ball grid array according to the invention.
Figure 2B:
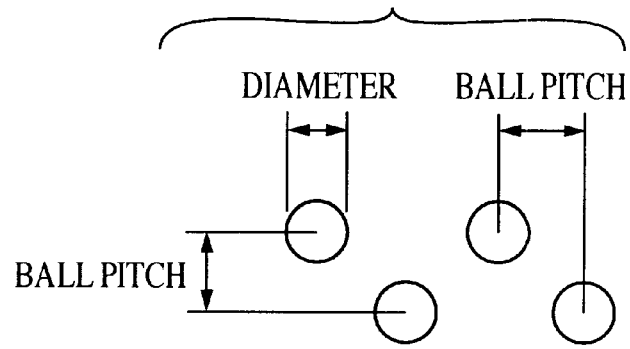
FIGS. 2B and 2C illustrate relevant grid characteristics of the grid types of FIG. 2A.
Figure 2C:
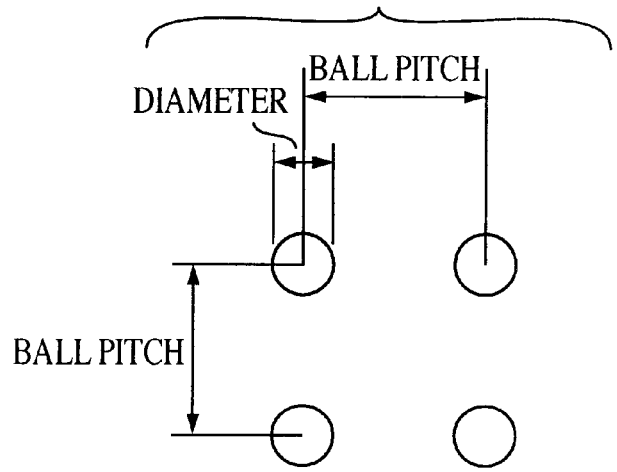

Prior to undertaking any run-time processing of the BGA components being manipulated, the vision system must be trained, as known in the art. Training or preprocessing is handled "off-line", i.e. prior to any assembly run, and basically involves constructing a data structure representing a model of the ball grid array on the component(s) to be processed. The model data structure represents a model grid in model space. Model space is defined as a function of the device on which the grid is located. Accordingly, the model data structure must have a full description of the device(s) being inspected, including dimensions of the device body on which the model grid is disposed. Likewise, the arrangement of the balls on the device is input to the model data structure during training. Ball arrangement is defined, in this illustrative embodiment, as one of three ball grid "types". The three grid types are illustrated in FIG. 2A, and include: regular grid, checker grid, and reverse checker grid. The model data structure includes relevant grid characteristics for the grid type of the model device. Grid characteristics include, ball dimensions, X, Y locations of balls in the grid, and pitch between the balls of the known good or standard component, as illustrated in FIGS. 2B and 2C for checker and regular type grids, respectively. The number of balls along each of two orthogonal axes in the grid must also be specified.

In an illustrative implementation the model characteristics are derived from geometric component definitions describing the features of interest. The geometric description can be input to the system as a synthesized file of ideal component characteristics provided by the component vendor, or they can be empirically derived and entered such as by manually measuring the component characteristics of interest to provide a synthesized model.

Figure 3:
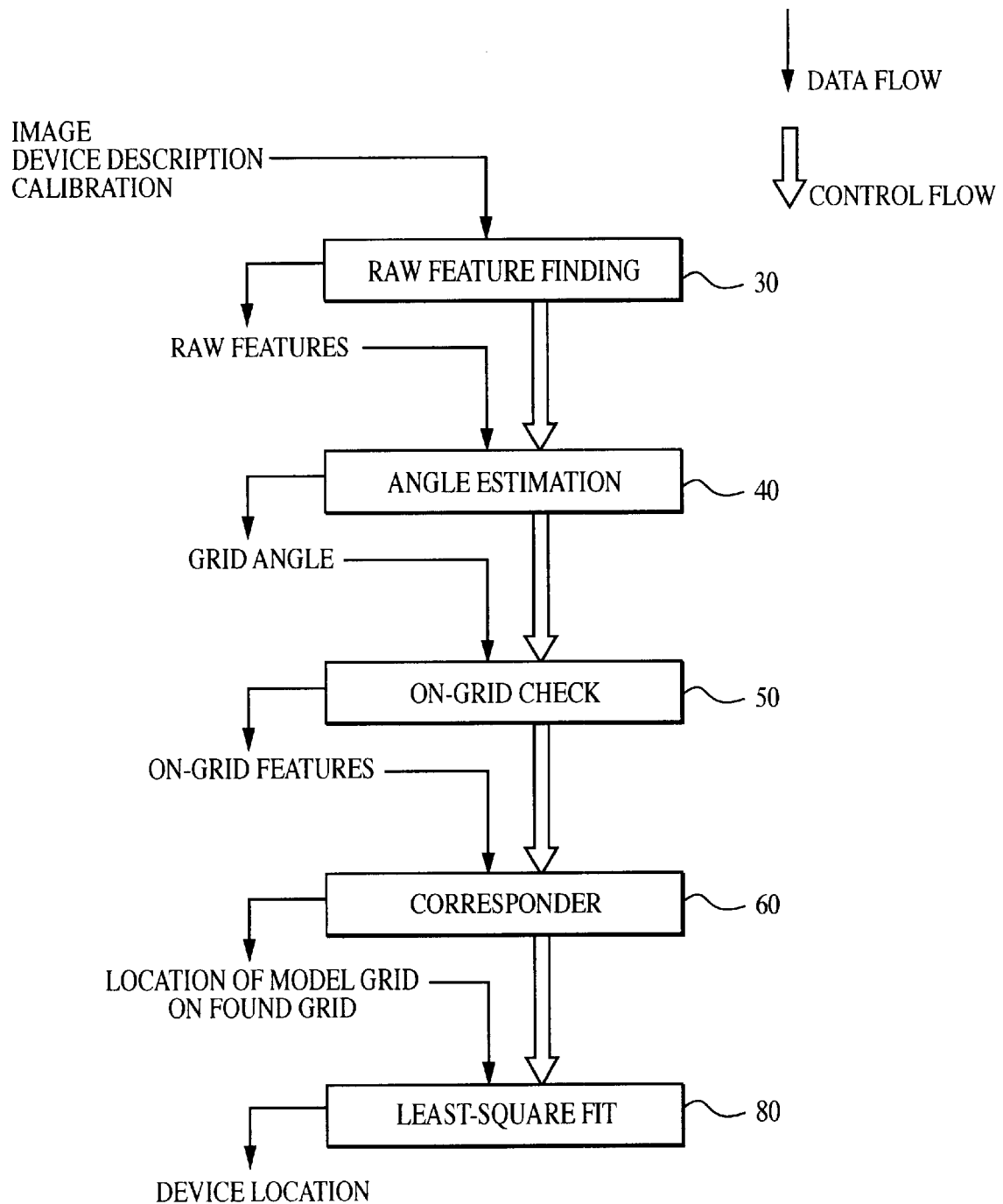
FIG. 3 is a block diagrammatic overview of a method and apparatus for locating and inspecting a two dimensional ball grid array according to the invention.
Figure 4:
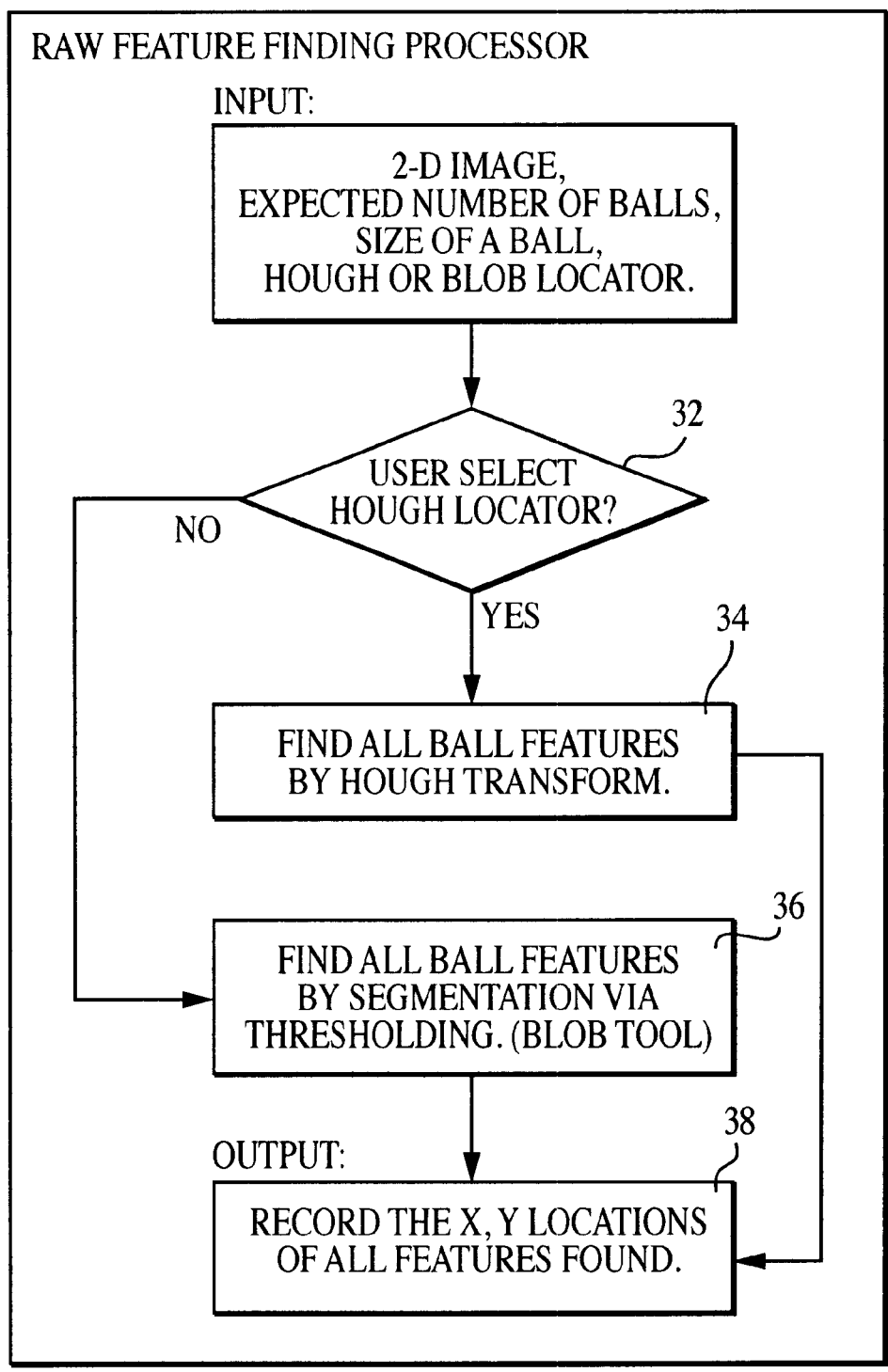
FIG. 4 is a block diagram of a raw feature finder processor of the method and apparatus of FIG. 3.

As illustrated in FIGS. 3 and 4, relevant model parameters, i.e. model information in the form of a device description (including an expected number of balls and the size of balls to be found, etc.) is input to a raw feature finding processor or feature finder 30. Captured image information in the form of a two dimensional image of the device (in image space) being inspected/located by the vision system working in conjunction with pick and place machinery is also input to the raw feature finding processor 30. In addition to the image, the raw feature finding processor 30 also receives calibration information comprising a two dimensional transform relating image space to physical space.

It should be appreciated that in certain applications it may be desirable to capture image data based on multiple fields of view of the same device, and to input multiple fields of view (MFOV) to the raw feature finding processor 30. For instance, when inspecting large devices it is sometimes impossible to fit the entire device into a single field of view and still retain the desired image resolution. In such cases it is necessary to use more than one field of view, i.e. MFOV, to entirely inspect the device. In a MFOV inspection the area of physical space that might contain the device is divided into a sequence of views or "tiles." Each of the views in an MFOV inspection is input as image data to the raw feature finding processor 30, and processed sequentially as described hereinafter.

The raw feature finding processor 30 uses a feature finding algorithm such as a Hough transform or Cognex Blob Tool, as known in the art, to find ball features, irrespective of the number of features present and/or found. The feature finder 30 in this illustrative embodiment is configured so that a user can select 32 to use a Hough locator 34 to find ball features. The Hough locator, as known in the art, generally works better locating balls on devices that have a light background, i.e. where the device body is lighter than the balls being located.

Alternatively, Cognex Blob Tool, as known in the art, can be selected to find ball features by segmentation via grey level thresholding 36, in which the image pixels are partitioned into regions that correspond to meaningful objects, i.e. balls in the grid. With Blob Tool, thresholding effects segmentation by using the image histogram to find a gray level threshold (T) indicative of the characteristic of interest, i.e. balls. The image can then be binarized, that is, all pixels with a gray value greater than T are mapped to a value "1" and the rest are mapped to "0". In this manner the image is segmented as a binarized image wherein all ball pixels have a value of "1". That is, image pixels with a value of "1" are representative of locations of found features/balls.

The raw feature finder 30 generates and records 38 in memory a list of raw features (in physical space) in the form of an X and Y location for each feature located. The number of entries in the list indicates the number of features found. The raw feature finder is run one time and must find at least two features in order to continue processing according to the invention. If at least two features are not found the process is terminated and an error is indicated. If at least two features are found the list of raw features from the raw feature finding processor 30 is passed to an angle estimation processor 40.

Figure 5:
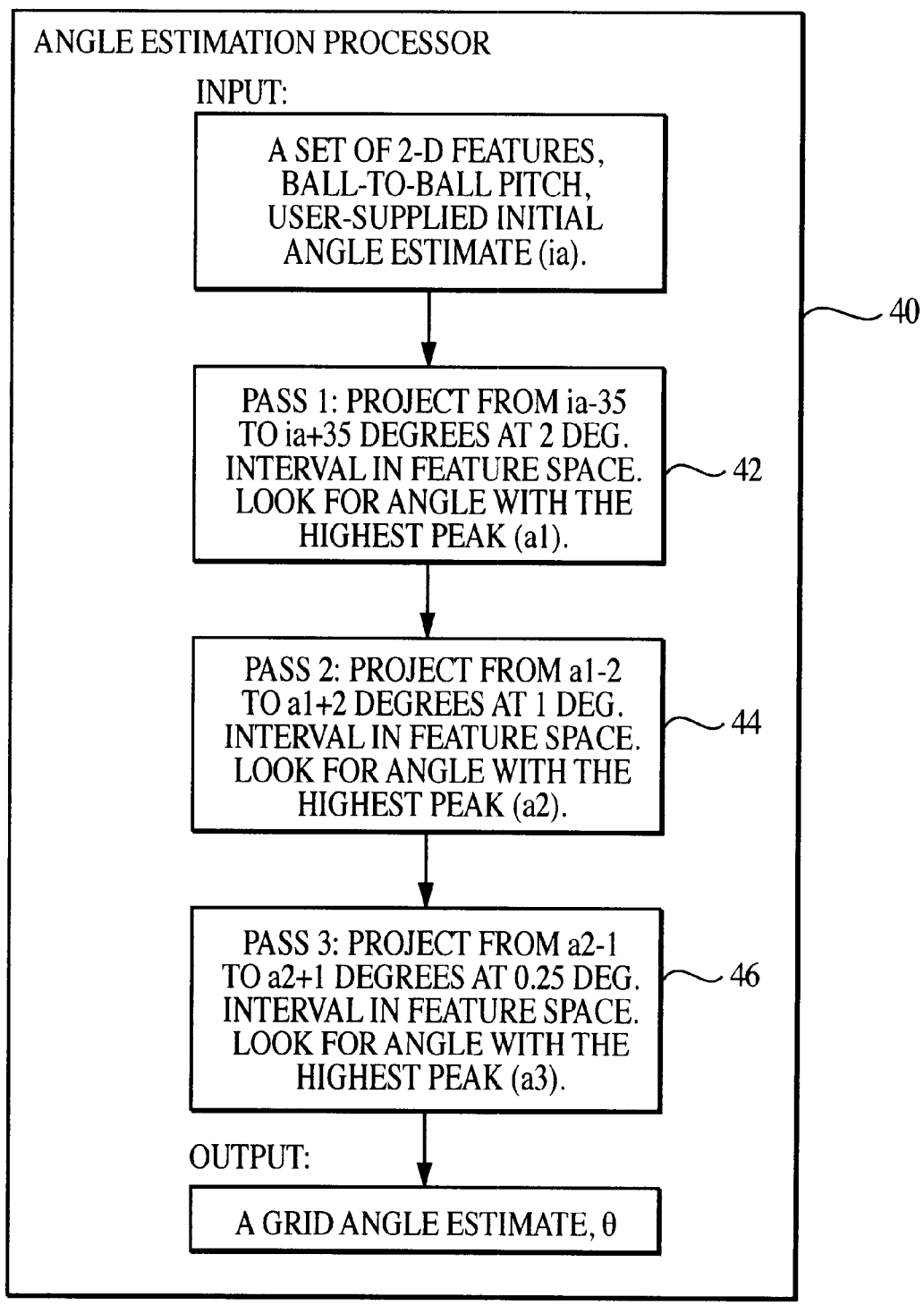
FIG. 5 is a block diagram of an angle estimation processor of the method and apparatus of FIG. 3.

The angle estimation processor 40, as illustrated in FIG. 5, receives the list of raw features from the feature finder 30, and receives additional inputs including a user estimated orientation angle (ia) and ball-to-ball pitch information from the model device description. The user estimated orientation angle is an approximation of the rotation of the physical ball grid from a model position, as estimated and input by the user. This illustrative embodiment accommodates a user estimated orientation angle that can be ±35 degrees from the true angle (although in practical applications the pick and place machinery manipulating the device is not likely to pick up the device at an angular orientation much greater than ten degrees from desired angle). The angle estimation process 40 uses the user estimated angle, the ball-to-ball pitch from the model description and the list of raw features to determine an estimated grid angle, i.e. a rough estimation of an orientation angle of the grid in physical space.

In determining the estimated grid angle, the angle estimation processor generates projection data in the form of projections of a plurality of histograms representative of data points corresponding to lines of balls at multiple candidate angles. The projection data is generated with respect to sets of co-linear data points substantially in accordance with a methodology described in U.S. patent application Ser. No. 08/820,691, entitled MACHINE VISION METHODS FOR IDENTIFYING COLLINEAR SETS OF POINTS FROM AN IMAGE, filed Mar. 18, 1997, which is hereby incorporated herein by reference. The projections are generated in successive passes in which each pass generates or projects a plurality of histograms. Each successive pass effects a progressively finer angular resolution leading ultimately to selection of a grid angle estimate based on a projection selected as having highest density peaks for the data points/features in the set.

As illustrated in FIG. 5, in a first pass 42 a histogram is projected at each of a first plurality of angles, starting from the user estimated angle (ia) and incrementing and decrementing the angle by two degrees over a range of ±35 degrees. Accordingly, in the first pass 42 thirty six histograms are generated covering a range of angles between ia +35 degrees and ia −35 degrees. The angle (a1) at which the associated histogram has the highest peak density is selected from the thirty six histograms generated in the first pass, and is used in a second pass as a first basis angle for generating another plurality of histograms.

In the second pass 44 a histogram is projected at each of a second plurality of angles, starting from the first basis angle (a1) and incrementing and decrementing the angle by one degree over a range of ±2 degrees. Accordingly, in the second pass 44 five histograms are generated covering a range of angles between a1 +2 degrees and a1 −2 degrees. In the second pass the angle at which the associated histogram has the highest peak density (a2) is selected from the five histograms, and is used in a third pass as a second basis angle for generating another plurality of histograms.

In the third pass 46 a histogram is projected at each of a third plurality of angles, starting from the second basis angle (a2) and incrementing and decrementing the angle by one quarter of a degree (0.25) over a range of ±1 degree. Accordingly, in the third pass 46 nine histograms are generated covering a range of angles between a2 +1 degree and a2 −1 degree. In the third pass the angle at which the associated histogram has the highest peak density (a3), i.e. the highest density peak projection, is selected from the nine histograms resulting from the third pass and is used as a final grid angle estimate or estimated grid angle. It should be appreciated that the estimated grid angle ("theta") determined at this point can be one of the angle of the major grid axis or a diagonal angle that is diagonal to, i.e. 45 degrees away from, the major grid axis.

Figure 6A:
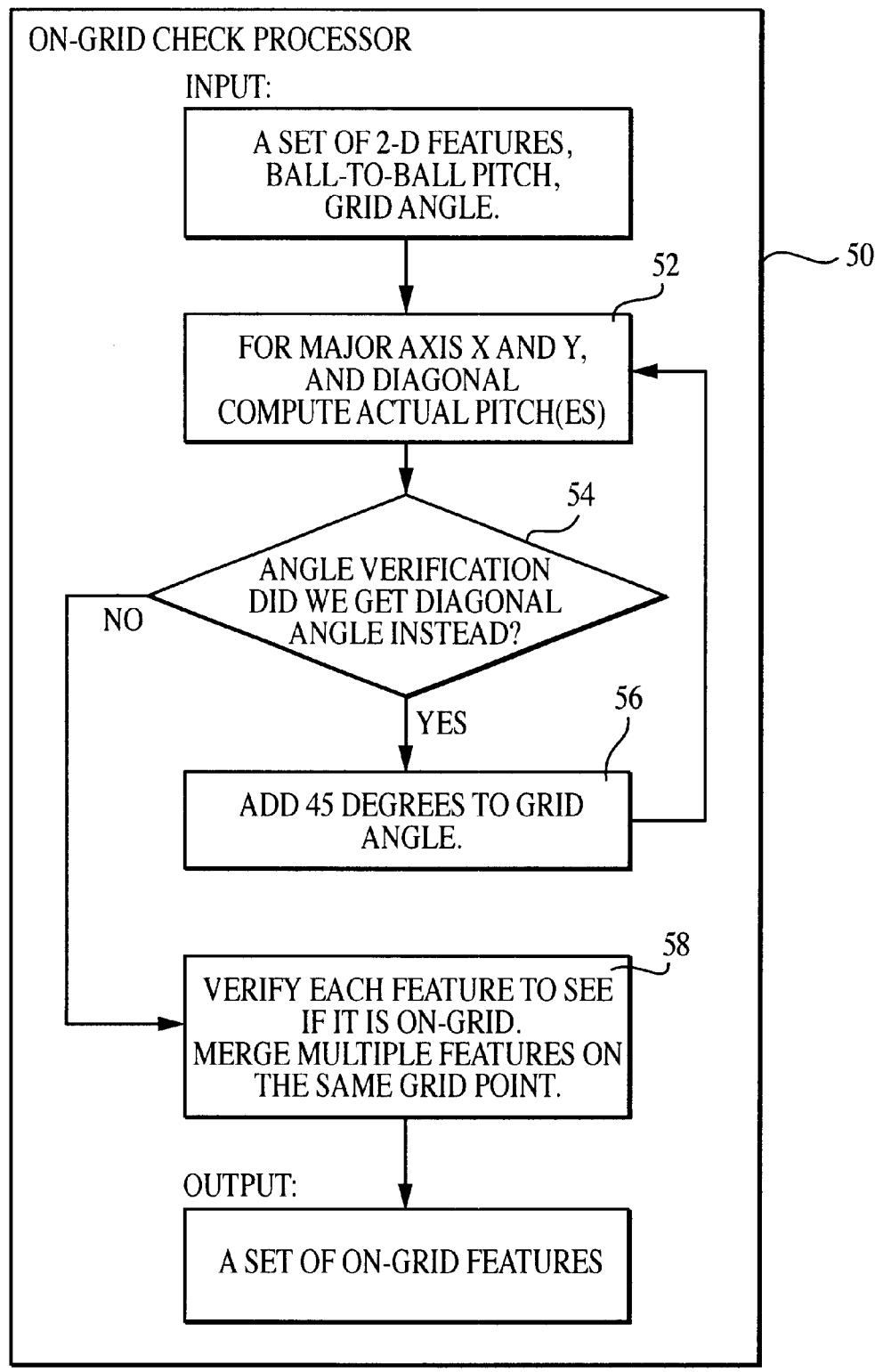
FIG. 6A is a block diagram of an on-grid check processor of the method and apparatus of FIG. 3.

An on-grid check processor 50, as illustrated in FIG. 6A, receives the estimated grid angle (theta) and projection data from the angle estimation processor 40, the list of raw features from the raw feature finding processor 30 and the ball-to-ball pitch information obtained from the device description during training. The on-grid check processor 50 uses the pitch specified in the device description, the estimated grid angle and the projection data to compute computed pitches in both X and Y directions relative to features found by the raw feature finder 30. Additionally, as it is not known at this point whether theta is the angle of the major grid axis or the diagonal axis, the on-grid check processor 50 also computes computed diagonal pitches using information about diagonal pitches from the device description. The computed pitches in X and Y and the computed diagonal pitches are ultimately used, as described in detail hereinafter, to verify the grid angle and effectively superimpose a grid on the found features/balls (i.e. verify on-grid features) while eliminating noise features and merging features that are the same feature but were found in slightly different locations in multiple fields of view. That is, the on-grid check processor 50 is configured to check or determine which features/balls found are on-grid features as opposed to unwanted noise features, in accordance with regularity of the found features and expected pitch.

Figure 6B:
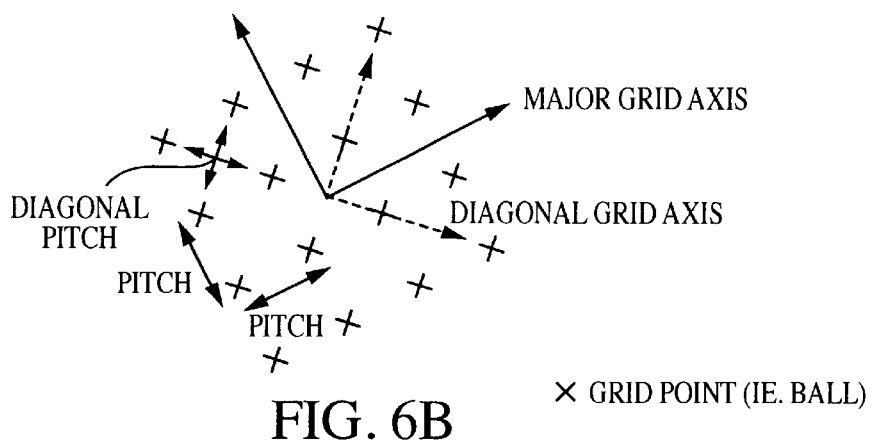
FIGS. 6B–6F are diagrams illustrating on-grid check processing according to the processor of FIG. 5A.

As illustrated in FIG. 6A, initially, the on-grid check processor 50 determines whether the angle (theta) found by the angle estimation processor 40 is the angle of the major grid axis or the diagonal axis, as illustrated in FIG. 6B. In making such a determination, computed or actual pitches ("P") for both the major axis and the diagonal are computed 52 in both the X and Y directions using the model pitch(es) ("p") specified in the device descriptions and the projection data from angle estimation.

By way of illustration, to compute actual pitches ("P") in the X direction ("X pitches") the device description pitch (model pitch p) and projection data at theta (the estimated grid angle) are used. A first point or feature at an extreme end in the projection at theta is selected as an initial base feature. Adjacent features are successively compared to determine if the adjacent features are separated by a distance (i.e. physical units, e.g. microns) that is greater or less than the model pitch ("p"), within a selected tolerance ("t"). If the first adjacent feature is less than the model pitch and selected tolerance away from the initial base feature it is disregarded as it is not likely to be a feature and the next successive feature is compared against the first adjacent feature which becomes the next base feature, to determine if they are separated by a distance that is greater or less than the model pitch (p).

If the adjacent feature falls within the selected tolerance of the model pitch away from the base feature, the base feature is centered within the selected tolerance and the adjacent feature is used as the base feature for comparison against successive features. The actual distances between the base feature(s) and the adjacent feature(s) that are within the selected tolerance of the model pitches are totalled to provide a sum of the distances (D). The number of features (N) that are within the selected tolerance of the model pitch away from the base feature is also totalled, by dividing the distance D by the model pitch p and adding the integer portion thereof to a number N which effectively tracks the number of features. The actual pitch P is computed by dividing the sum of the distances (D) by the number (N) of features (P=D/N), effectively providing an average pitch. This processing is undertaken successively with each of the points/features except the last one in the projection at theta, as it will have no adjacent feature.

Processing is also undertaken in phases wherein in an initial phase only a subset or small set of adjacent found features or points in a projection (i.e. teeth in a comb) is processed to determine a refined pitch. In successive phases, performed in the same manner, the refined pitch and a greater number of features in the projection is used to ultimately arrive at an actual or computed pitch. The number of points/features selected for the initial phase is fixed and selected as a function of an assumed error or pitch tolerance. The numbers of points/features used in successive computations is increased based on the expected accuracy of the refined pitch from the preceding phase. The more accurate the refined pitch from the previous phase, the more teeth used in the next phase, and the fewer the number of iterations or phases required to compute actual pitch in this illustrative embodiment.

Figure 6C:
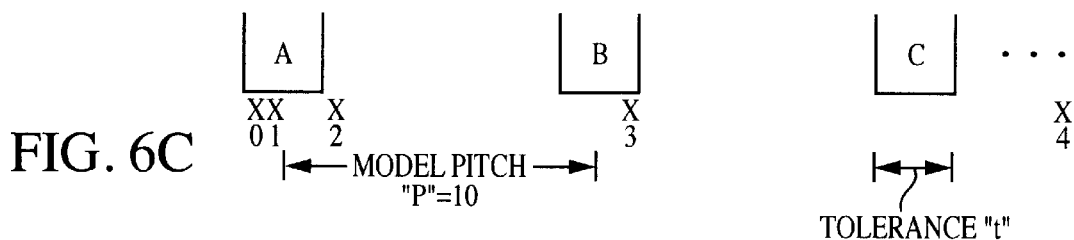
Figure 6D:
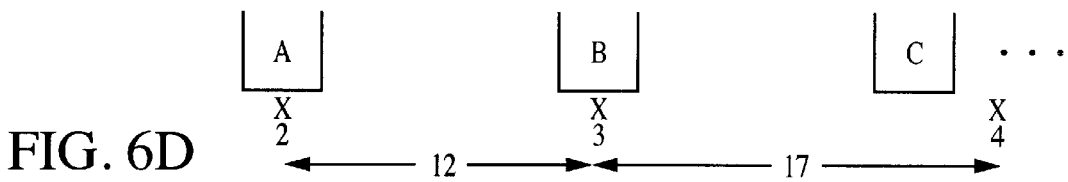
Figure 6E:
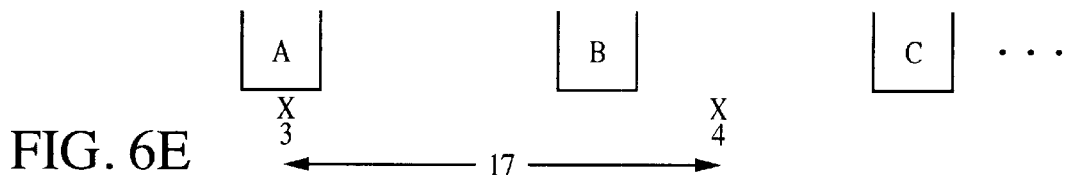

Processing to compute actual pitch P, as discussed hereinbefore, is further illustrated by example in FIGS. 6C–6E wherein each projected point/feature at theta is designated by "X" and labelled 0–4. In this example, the model pitch "p", i.e. the expected pitch as determined by the device description, is equal to 10. Features are expected to be separated by pitch p within a selected tolerance "t". Accordingly, t represents areas, designated "A", "B" and "C", centers of which are ideally separated by p, as illustrated in FIG. 6D (these areas separated by the requisite distances can be envisioned as "teeth" of a "comb").

Referring now to FIG. 6C and FIG. 6D, in this example point/feature 0 is first considered. The distance between feature 0 and adjacent feature 1 (best seen in FIG. 6C) is less than p, so it is effectively ignored and the next feature and its adjacent feature are considered. That is, feature 2 is considered in order to determine if it is p±½t from feature 1. In this example, feature 2 is also less than p from feature 1, so it too is effectively ignored. Next, in considering feature 2 as it relates to feature 3, it is determined that feature 3 is greater than p away from feature 2, i.e. it is 12 away. Accordingly, feature 2 is considered to be the first feature and is centered in t establishing a first tooth of the comb (FIG. 6D). The distance between features 2 and 3 (i.e. 12) is added to the sum of the distances D (which is initially 0), and D is divided by p (i.e. 12/10) to add the integer portion (1) to N.

Next, feature 3, which is centered on a comb tooth as it has been determined to fall within a tooth that is a distance of P from a feature, is considered as it relates to immediately adjacent feature 4. It is determined that the distance between features 3 and 4 is 17, which falls outside of a comb tooth (i.e. is greater than p ±½t from its adjacent feature 3). Accordingly, feature 4 is effectively ignored, and all points/features in this example have been processed. The refined pitch (which can be considered to be an initial pitch P), is computed as D/N and is thus equal to 12 in this example. In subsequent phases, greater numbers of teeth, i.e. points in the projection, are processed in the same manner until all points in the projection are processed and actual pitch P is computed.

Substantially the same computation is undertaken to compute actual pitches in the Y direction ("Y pitches"), using the device description pitch in the y direction for p and projection data at the estimated grid angle theta +90 degrees.

Again, as it is not known at this point whether the angle (theta) found by the angle estimation processor 40 is the angle of the major grid axis or the diagonal axis, it is necessary to compute pitches in the diagonal to the X and Y directions in order to compare with the major grid axis pitches. To compute diagonal pitches in the diagonal of the X and diagonal of the Y directions ("X diagonal pitches" and "Y diagonal pitches" respectively), the device description X and Y diagonal pitches and projection data at the estimated grid angle theta plus and minus 45 degrees are used, and computation is effected substantially as described hereinbefore. Accordingly, computed actual pitches are determined in the X direction, the Y direction, the diagonal of the X direction and the diagonal of the Y direction.

After computing the major axis and diagonal pitches, a comparison is effected in order to determine if theta obtained in angle estimation is relative to the major axis or the diagonal axis 54. The comparison is done by first checking if the computed actual pitches are close to the device description pitches (the "model pitches"). Computed actual pitches and the model pitches are considered close if their difference is less than 10% of the model pitch. Thus, the difference between the computed pitch in the X direction and the model pitch in the X direction (an "X difference") is calculated to determine if it is less than 10% of the X direction model pitch. The difference between the computed pitch in the Y direction and the model pitch in the Y direction (a "Y" difference") is calculated to determine if it is less than 10% of the Y direction model pitch. Similarly, the difference between the computed actual pitch in the diagonal of the X direction and the model pitch in the diagonal of the X direction (a "diagonal X difference") is calculated to determine if it is less than 10% of the model pitch in the diagonal of the X direction, and the difference between the computed pitch in the diagonal of the Y direction and the model pitch in the diagonal of the Y direction (a "diagonal Y difference") is calculated to determine if it is less than 10% of the model pitch in the diagonal of the Y direction.

If none of the computed differences, i.e. the X difference, Y difference, diagonal X difference and diagonal Y difference, is within 10% of the model pitches the inspection has failed to find a valid grid structure from the set of found ball features. In such a case the inspection has failed and the inspection process is terminated.

If either the X difference or Y difference is less than 10% of the X direction model pitch or the Y direction model pitch, respectively, and neither the diagonal X difference nor the diagonal Y difference is less than 10% of the model pitch in the diagonal of the X direction or the model pitch in the diagonal of the Y direction, respectively, it is concluded that theta, the estimated angle, is the angle of the major grid axis (the "major grid axis angle"). The computed X and Y pitches at what has been determined to be the angle of the major grid axis are then used to verify found features (i.e. eliminate noise features), as described hereinafter.

If either the diagonal X difference or the diagonal Y difference is less than 10% of the model pitch in the diagonal of the X direction or the model pitch in the diagonal of the Y direction, respectively, and neither the X difference nor Y difference is less than 10% of the X direction model pitch or the Y direction model pitch, respectively, it is concluded that theta is the angle of the diagonal grid axis (the "diagonal grid axis angle"), i.e. 45 degrees away from the major grid axis. Accordingly, 45 degrees is added to theta so that it measures the major grid axis angle. Then, the angle projections are re-run at the new theta and theta +90 degrees. These results are then used to generate re-computed pitches in the X and Y directions. The recomputed X and Y pitches are used to verify found features (i.e. eliminate noise features), as described hereinafter.

If either the X difference or Y difference is less than 10% of the X direction model pitch or the Y direction model pitch, respectively, and either the diagonal X difference or the diagonal Y difference is less than 10% of the model pitch in the diagonal of the X direction or the model pitch in the diagonal of the Y direction, respectively, it is difficult to conclude whether theta, the estimated angle, is the major grid axis angle or the diagonal grid axis angle. Thus further verification is necessary.

Figure 6F:
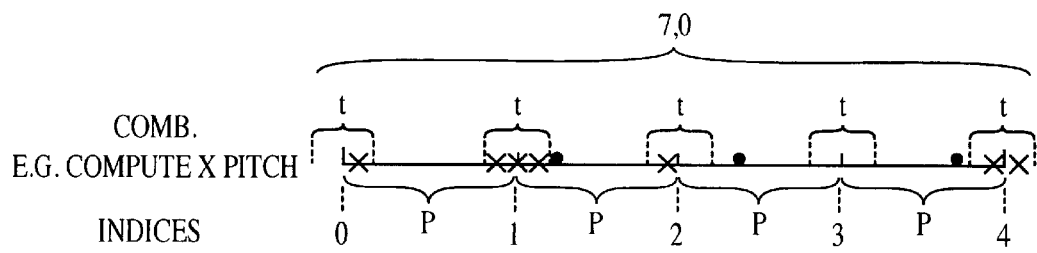

Further verification of theta is effected by examining how well the sets of projected one-dimensional features fit on "combs" with the computed pitches, as illustrated in FIG. 6F. Features that do not fit on combs (i.e. within the selected tolerance of features separated by the calculated actual pitch), are considered to be noise features and may not be considered in further processing. That is, a comb 70, which in this illustrative embodiment is an array of points in a one-dimensional projection, is defined by establishing points (represented in FIG. 6F by indices 0, 1, 2, 3, 4) that correspond to the location of features/balls separated by the computed pitch (P). The comb includes the selected acceptable tolerance (t) about the points within which a feature could be located while being within acceptable tolerances in accordance with the device description or model.

The projection information from the angle estimation processor 40 is used to determine how many of the set of found features (from the raw feature finding processor 30) in a one-dimensional projection (from the angle estimation processor 40) fit within the tolerance (t) of respective points in a projection representing the location of a feature/ball separated from other features/balls by the computed pitch (P). Thus an array is constructed, one for each of X and Y and diagonal of X and Y computed pitches, including a plurality of indices, each of which represents a point or location of a feature in accordance with the computed pitch. Each array element contains an indication of a comb tooth (i.e. non-zero width range of coordinates to which a point can be matched), within which the corresponding point of the respective index falls. That is, the array effectively provides an indication of what tooth each feature in the array falls on.

In this further verification of theta, counts are maintained relating to features and non-features in the projection data at the relevant angles from the angle projection processor 40. In this illustrative embodiment, the projection data generated for the X direction, the Y direction, the diagonal of the X direction and the diagonal of the Y direction for the estimated grid angle theta are used in the verification of theta.

A first count (COUNT 1) is maintained to count the number of features from each projection that do not fit on a comb with the computed X pitch. A second count (COUNT 2) is maintained to count the number of features that do not fit on a comb with the computed Y pitch. A third count (COUNT 3) is maintained to count the number of features that do not fit on a comb with computed X diagonal pitch, and a fourth count (COUNT 4) is maintained to count the number of features that do not fit on a comb with computed Y diagonal pitch.

If COUNT 1 plus COUNT 2 (i.e. the total number of features that do not fit on combs with the computed X and Y pitches) is less than COUNT 3 plus COUNT 4 (i.e. the total number of features that do not fit on combs with the computed X diagonal and computed Y diagonal pitches), it is concluded that theta is the major grid axis angle, because there are fewer found features not fitting on combs with the computed X and Y pitches. Having concluded that theta is the major grid axis angle, and having constructed arrays representing features that fit on combs with the computed X and Y pitches, features that do not fit on the combs, i.e. are not within the selected tolerance t, can be disregarded or no longer considered as they are likely to be noise features. Thus, in the process of constructing the arrays in the context of verifying whether theta is the major grid axis angle or the diagonal thereof, a verification of found features has essentially been effected in that features not fitting on the combs can be ignored in further processing.

If COUNT 1 plus COUNT 2 (i.e. the total number of features that do not fit on combs with the computed X and Y pitches) is greater than COUNT 3 plus COUNT 4 (i.e. the total number of features that do not fit on combs with the computed X diagonal and computed Y diagonal pitches), it is concluded that theta is the diagonal grid axis angle, because there are fewer found features not fitting on combs with the computed X diagonal and Y diagonal pitches.

Having concluded that theta is the diagonal grid axis angle, 45 degrees is added to theta (56, FIG. 6A) so that it measures the major grid axis angle. A new projection is generated at this major grid axis angle in both the X and Y dimension, i.e. at theta and theta plus 90 degrees. The results of this projection are then used to re-compute pitches in the X and Y directions, as described hereinbefore. Two one-dimensional arrays are then constructed using the recomputed X and Y pitches, establishing combs that are used to verify found features, i.e. to eliminate noise features.

In constructing the two one-dimensional arrays, found features are verified 58 as on-grid features in order to eliminate off-grid noise features, after having determined the major grid axis angle (i.e. the angular rotation of the physical grid from the model orientation). In verifying the found features, an examination is effected as to how the projected one-dimensional features fit on combs with the computed pitches, substantially as described hereinbefore and with respect to FIG. 6F.

Once theta and the found features have been verified, the two one-dimensional arrays, representing features on combs in the X direction and Y direction, are used to construct a two dimensional array representing the grid of the ball grid array under inspection. Based on the two sets of indices from the two one-dimensional arrays, a two-dimensional array is constructed that marks the presence/absence of all on-grid features. Each of the one-dimensional arrays (one for the X direction and one for the Y direction) effectively tracks which features are projected to which teeth on a given comb.

In constructing the two dimensional array, for example, if the X projection is represented by a comb that has ten teeth and the Y projection is represented by a comb that has eight teeth, the two dimensional grid constructed is a 10×8 array. If a feature with particular X, Y translation parameters is in the i-th tooth of the X projection comb and the same feature (i.e. with that particular X, Y translation) is in the j-th tooth in the Y projection comb, that feature is assigned to the (i, j) position in the constructed two-dimensional grid. Similarly, if no feature is projected to the m-th tooth in the X projection comb and no feature is projected to the n-th tooth in the Y projection comb, the (m, n) position in the constructed two dimensional grid will be empty (i.e. no feature mapped thereto). For each two dimensional array element constructed from the two one-dimensional arrays, the corresponding X, Y translation parameters, i.e. physical space location, is stored.

In applications where a component is inspected/located based on Multiple Fields of View, it may be necessary to merge features that were found in slightly different locations in the multiple fields of view. Features must be merged if they fall within a selected tolerance (i.e. number of pixel locations) of the same grid point in the two-dimensional array. An average is computed for each grid point that requires merging, so that the X, Y location of a merged feature is the average X, Y of all the features to be merged to this grid point. Thus having merged any pluralities of the grid points that fell within the tolerance of a single point or feature, the two dimensional array represents a set of on-grid features that are passed to a correspondence processor (60, FIG. 3) to determine the correct positioning of the grid of found features relative to the model grid.

The correspondence processor 60 receives, as available from the on-grid processor 50, a set or list of found and verified on-grid features in the form of a list of X and Y translation parameters for each feature/ball found to be on-grid. The correspondence processor 60 also receives model grid information (i.e. from the model device description), and searches for correspondence between the two dimensional array of found grid features and the two dimensional array of model grid features.

Figure 7A:
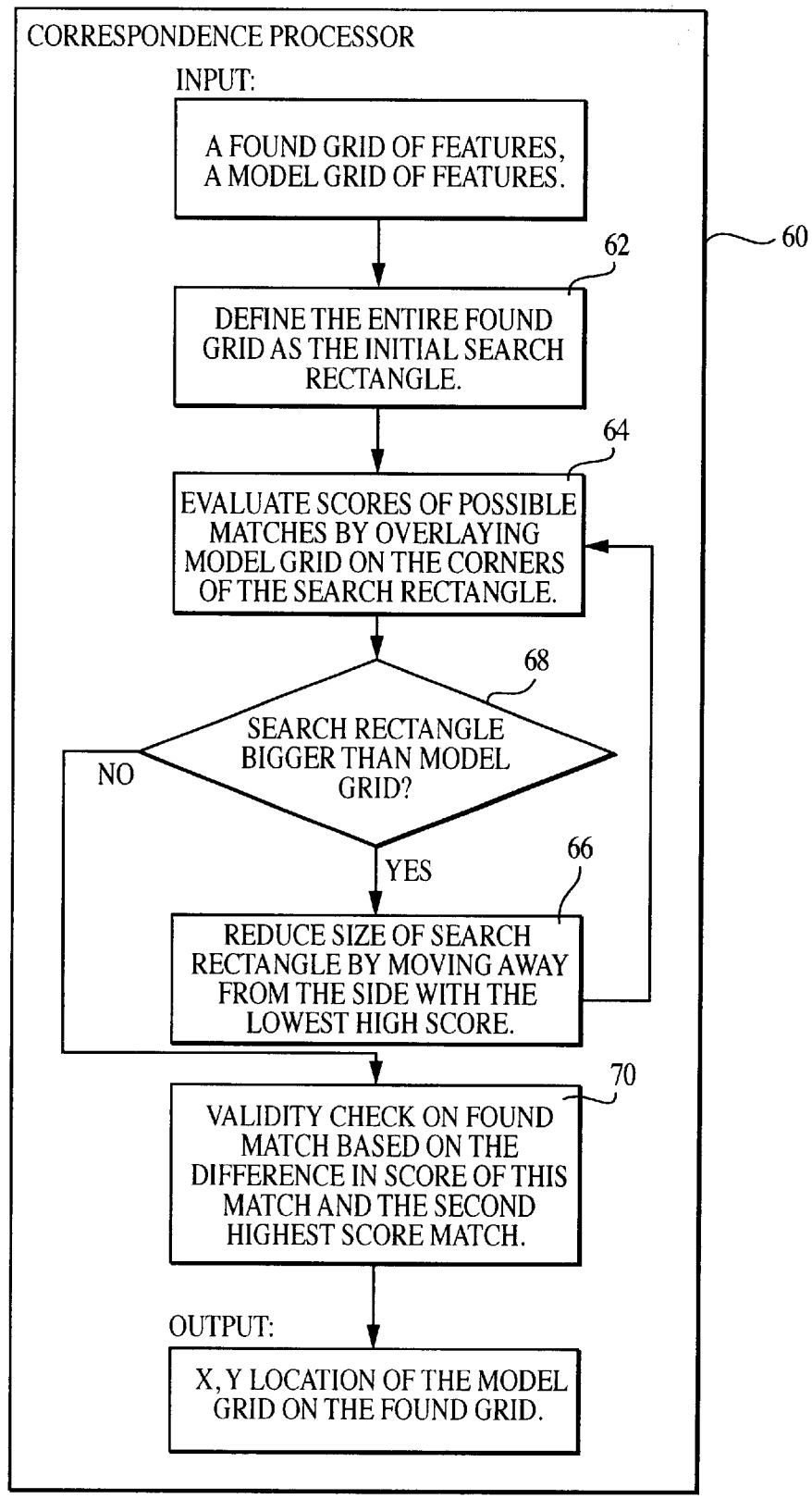
FIG. 7A is a block diagram of a correspondence processor of the method and apparatus of FIG. 3.
Figure 7B:
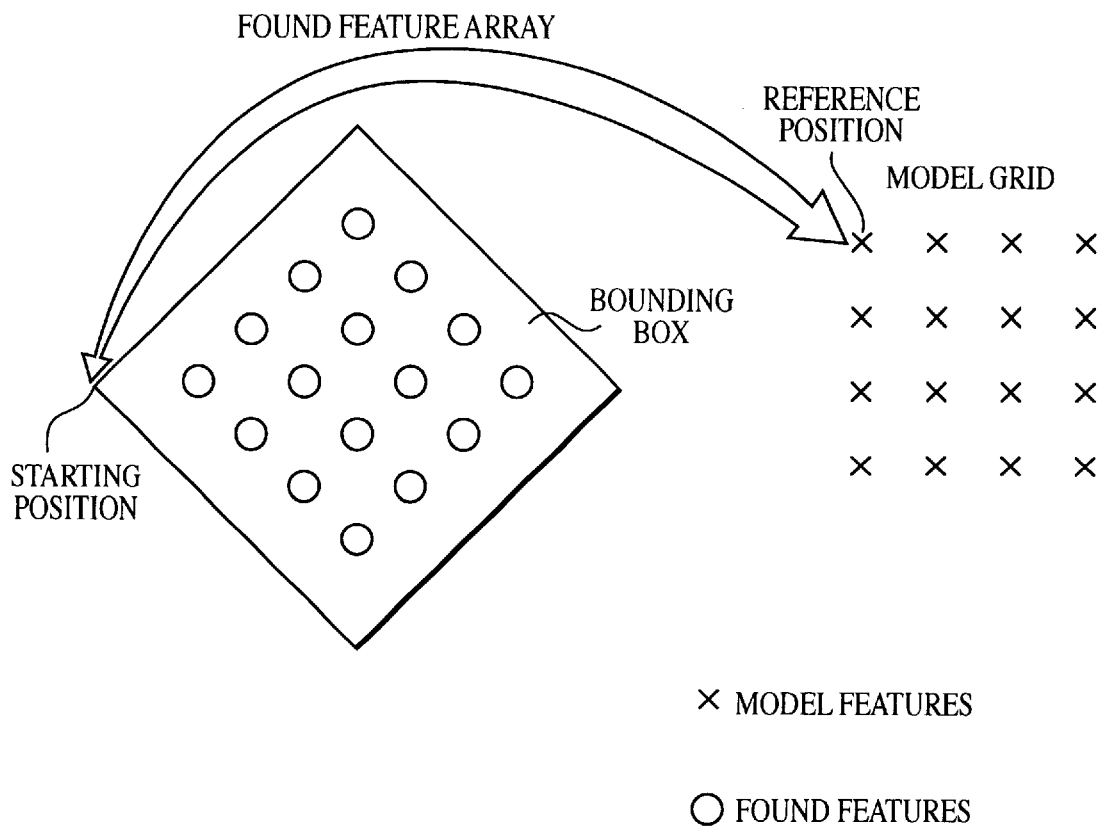
FIG. 7B is a diagram illustrating correspondence processing according to the correspondence processor of FIG. 7A.
Figure 9:
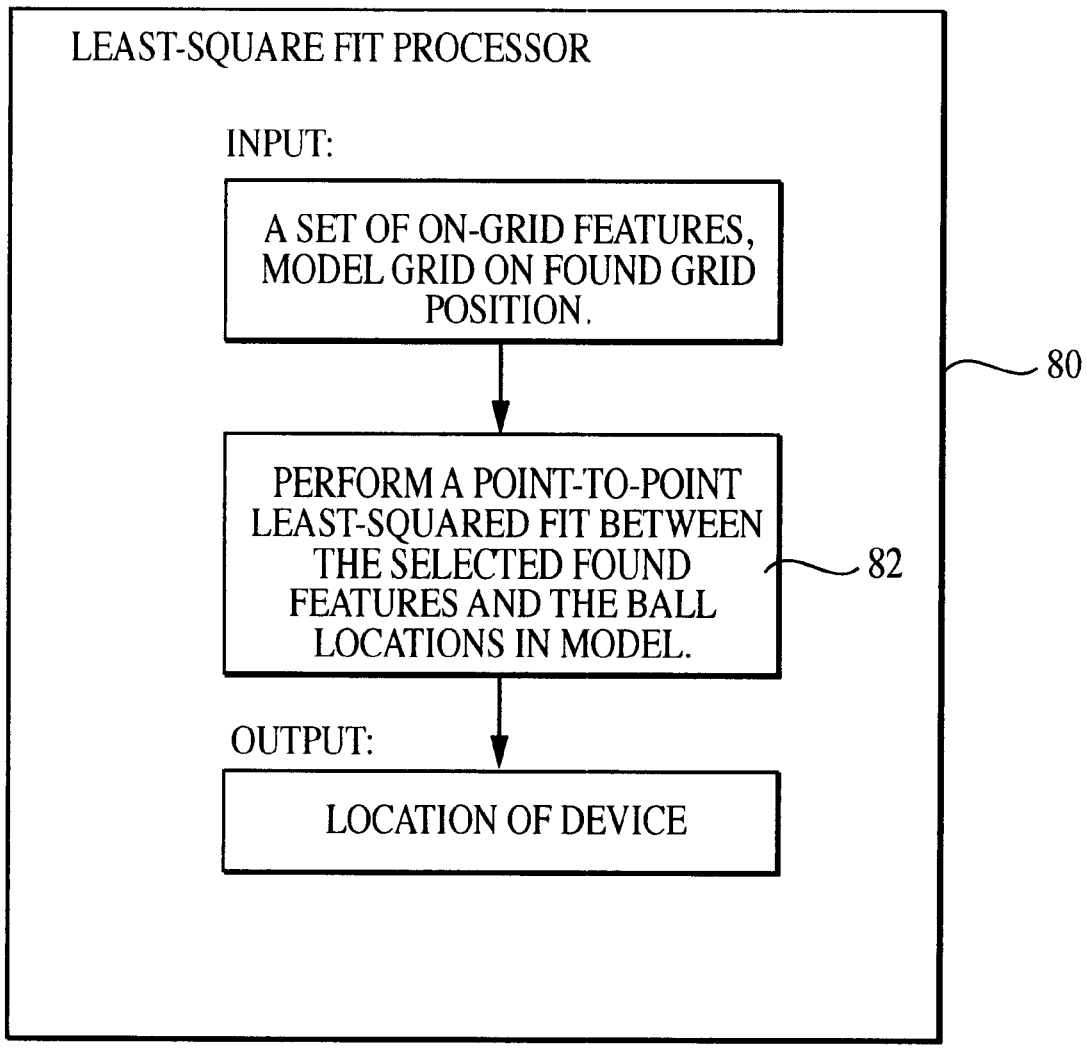
FIG. 9 is a block diagram of least square fit processing of the method and apparatus of FIG. 3.

Correspondence, i.e. a direct mapping of respective two is dimensional spatial relationships between model features and image features as illustrated in FIG. 7A, is effected by the correspondence processor 60 via initially defining a search rectangle 62. In this illustrative embodiment, the search rectangle is defined to encompass the entire found grid. That is, the initial search rectangle is a bounding box, or box that encompasses all of the points/features identified in on-grid processing. In order to ensure that all features are encompassed, the bounding box is defined to be a selected number of rows and columns greater on each side than the most extreme rows and columns of the found feature array. In this illustrative embodiment the bounding box is defined by a two dimensional data structure, e.g. array, that is larger than the two-dimensional found feature array but encompasses the found feature array therein.

The model grid, which is also a two-dimensional data structure, is then processed against the bounding box incorporating the two-dimensional found feature array. Starting at a selected array element, which in this embodiment is the upper leftmost corner element/feature of the model, the model array is effectively superimposed over the found feature array and correspondence between model features and found features is tested. A score array is maintained 64 to record in each element a number of model features and found array features that correspond when the model array is superimposed on the found feature array in a particular position, using the starting selected array element as a reference. After a first positioning is processed and the score is entered in the scoring array, the position of the superposition of the model on the found feature array is changed, such as by moving the model one position along a row or column from the previous position of the reference position (i.e. the starting position or the upper leftmost array position). In this manner, scores are successively generated and entered in the score array. Each score in each array element of the scoring array represents the number of elements in the model array that corresponded to a like number of elements in the search rectangle with the reference position in that particular position.

Although an exhaustive scoring could be effected, in order to avoid a computation intensive and overhead intensive analysis, in a first phase of scoring the position is changed so that the exterior or boundary rows and columns of the search rectangle are processed first. That is, a selected point on the model grid is positioned and scored for every position on the exterior or periphery of the search rectangle. Scores entered into the score array are checked to determine whether the scores are going up or down, so that further analysis can be effected by moving the model grid superposition in a direction in which the scores are going up, i.e. in a direction such that greater numbers of model features are corresponding with found features.

Correspondence processing continues by repositioning the model grid around the periphery of the search rectangle, as long as the search rectangle is bigger than the model grid. Based on the score distribution from the first correspondence processing further correspondence processing is effected in a second iteration in which the search rectangle is reduced in size 66. Size reduction of the search rectangle is effected by moving the positioning of the model grid inwardly, away from the periphery that has already been processed and away from the side with the lowest score(s). Points on the periphery that have already been tested need not be retested.

When the search rectangle is the same size as the model grid 68, all of the potential positions of superposition of the model grid on the search rectangle have been effected and scores recorded in the scoring array elements indicative of the position of the reference position with respect to the search space. The position in the score array that has the highest score indicates the position whereat the reference position of the model grid is optimally located in order to maximize correspondence between elements/features in the found feature array and the model array or grid.

The validity of the correspondence obtained based on determining the highest score in the score array can be checked 70, by subtracting the highest score from the second highest score. Validation is required to ensure that the highest score obtained is in fact the correct positioning, which can be ensured by ensuring that the highest score is well above the next highest score. Such validation is essential, for instance, in the event that a full row or column of features is not found, which might result in two equal highest scores or two very close highest scores.

Accordingly, if there is more than one positioning that gives the same maximum/highest score, the inspection fails because no valid correspondence is found. That is, the result of the inspection is ambiguous as there can/should be only one correct correspondence.

When only a single highest/maximum score is determined, that score is subjected to a global and a local validity check. That highest score, and consequently the inspection, is valid only if both the local and global validity checks are passed.

In a first case illustrating the local validity check, referring now to FIGS. 8A–8D, correspondence between the model grid (FIG. 8A) and the found grid (FIG. 8B) as determined during correspondence processing described hereinbefore is checked by determining the correspondence that results in the highest score (as illustrated in FIG. 8C). In this example, the correspondence with the highest score yields a score ("C") of 14, meaning that in the particular position represented by that location in the score array, 14 features from the model grid and the found features match up.

In the local check, only scores (i.e. number of correspondences) that are neighbors of the position that yielded the highest score are considered. That is, the only scores considered are those that are one row up or down and one column left or right of the highest score. In a two-dimensional array there are at most eight such neighbor scores for any highest score C, and there are fewer than eight neighbor scores if C is at the boundary of the score array. In this example, the highest neighbor score, illustrated in FIG. 8D and represented as "L" is equal to 11. The local validity check is passed if:

$$C-L \geq 0.5 \times F;$$

where F ("fallout") is the number of features that were matched or had correspondence in the position resulting in the highest score C and which are exposed or unmatched in the position of the highest neighboring score L. A threshold factor, in this example set equal to 0.5, effectively establishes a level of confidence required in positioning the found features relative to the model grid. Thus, in this first case, the local validity check passes because the difference between C and L (i.e. 14–11) is greater than one half of F (i.e. 2).

If the local validity check passes, as in this first case, then a global check is done. The global validity check uses C, the correspondence with the highest score, and the score for the position that has the second highest score ('G") which need not be a neighbor of the highest score position. The global validity check passes if:

$$C-G \geq 0.5 \times f;$$

where f, similar to the local validity check, is the number of features that were matched or had correspondence in the position resulting in the highest score C and which are exposed or unmatched in the position of the second highest score G. Therefore, in this example, if the highest scored neighbor is the same as the second highest score (i.e. L=G), the global validity check would pass, as the fallout (f=4) in the global check would be the same as the fallout (F=4) from the local check.

By way of further example, in a second case, illustrated in FIGS. 8E–8G, seventeen features are found (FIG. 8E). The correspondence that results in the highest s score, C, yields 14 matches or correspondences (FIG. 8F). The neighbor correspondence that yields the highest score (FIG. 8G) has 13 matches. The fallout, F, i.e. the number of features that were matched or had correspondence in the position resulting in the highest score C and which are exposed or unmatched in the position of the highest neighboring score L, is equal to 4. Thus this validity check fails, as C–L is not greater than 0.5 F (i.e. 14–13<0.5(4)).

A failed local (or global) validity check results in return of an error, as the optimal positioning of the found features relative to the model grid has not been unambiguously determined, or it has not been determined to a level of satisfaction as defined by the user in setting the threshold factor (0.5). It should be appreciated that the threshold factor used in both the local and global validity checks can be changed depending on how much noise the user wants the algorithm to tolerate. A higher factor means smaller amounts of noise will be tolerated, or correspondence will be accepted only if there is a high degree of confidence. A lower factor means larger amounts of noise will be tolerated, or correspondence will be accepted with a lower degree of confidence.

Accordingly, upon passing the validity check the correspondence processor yields a direct mapping of respective two dimensional spatial relationships between model features or balls and found image features or balls. Correspondence between model balls and image balls, or equivalently, a two dimensional rigid transform that maps model balls to corresponding balls in image space can then be used, knowing the two dimensional linear mapping between physical space and image space, to determine the spatial relationship between model space and physical space in order to position/align balls of the device in physical space in accordance with model balls in model space.

Finally, a least square fit is effected as a fine alignment to refine the position of the device in terms of its translation and rotation. A least square fit processor 80, illustrated in FIG. 8, receives the set of on-grid features in the form of a set or list of X, Y translation parameters for each found on-grid feature in the two-dimensional array, and the model parameters for locations of the features from the model device description. The least square fit processor processes the found grid information and the model grid information to perform a point-to-point minimum square error transformation 82, as known in the art and as described for example in SYMBOL RECOGNITION IN ELECTRICAL DIAGRAMS USING PROBABILISTIC GRAPH MATCHING, Groen, Franz C. A., Sanderson, Arthur C. and Schlag, John F., Pattern Recognition Letters 3 (1985) 343–350 which is incorporated herein by reference, that is used in a final fit to provide a more accurate actual device location. The device location can then be manipulated by pick and place hardware in order to place the device in its proper location/destination, e.g. for assembly on a PCB.

Although the illustrative inspection method and apparatus described is implemented for inspection of Ball Grid Array packaged surface mount devices, it should be appreciated that the invention may be adapted to inspect flip chip devices, or other assemblies with the feature grid characteristic. Further, it should be appreciated that the invention can be applied in the identification of any model partial grid pattern on a set of two-dimensional feature points.

Further, it should be appreciated that alternative feature finders, other than Hough transform and Cognex Blob Tool can be implemented to find features and generate feature data corresponding to ball features in the image consistent with the model feature set data structure, such as correlation search or template matching or the like.

Although an angle estimation process is described herein wherein three passes are effected having a first pass with angular resolution changing at intervals of two degrees, a second pass with angular resolution changing at intervals of one degree and a third pass with angular resolution changing at intervals of one quarter of a degree, it should be appreciated that angle estimation can be implemented with an alternative number of passes at different intervals of angular resolution, e.g. two passes with the first at angular intervals of three degrees and the second at one degree, as a function of the acceptable resolution of angular orientation.

While actual pitches are described hereinbefore as being calculated by successively comparing adjacent features to determine if the adjacent features are separated by a distance that is greater or less than the model pitch ("p"), within a selected tolerance, it will be appreciated that alternative methodologies can be implemented for determining actual pitch, such as by using the model pitch in a projection and performing a least square fit on the projection results to find the pitch that gives the smallest least square error.

While the method and apparatus according to the invention described herein are described as mechanisms implemented in the context of a pick and place apparatus which manipulates electronic devices, it will be appreciated that the mechanisms according to the invention can be implemented in contexts other than pick and place machinery, including but not limited to other forms of machinery for manipulating and/or inspecting objects.

Although the method and apparatus described hereinbefore is described as being implemented as discrete mechanisms or processors, including a raw feature finding processor, an angle estimation processor, an on-grid check processor, a correspondence processor and a least square fit processor, it should be appreciated that the processing effected by the individual processors, whether implemented in hardware or software, can be implemented as a single processor or multiple processes effecting the functionality ascribed to the discrete processors as described.

While the method and apparatus described herein is described for corresponding ball grid array features on a ball grid array device with a model of a ball grid array device for placement of the ball grid array device on an electronic assembly, it will be appreciated that the method and apparatus can be implemented for locating and positioning virtually any grid array features on a mating grid.

Furthermore, while the method and apparatus according to the invention described herein are described as mechanisms implemented in a machine vision system including vision tools, such as Cognex vision systems and tools, it will be appreciated by those skilled in the art that all of the mechanisms can be implemented in software and executed on a general purpose computer or microprocessor. Alternatively, one or more modules can be implemented as a specialized computational element in cooperation with other specialized hardware and/or software for implementing the functionality of the mechanisms described.

Although the invention is described herein with respect to illustrative embodiments thereof, it should be appreciated that the foregoing and various other changes, omissions or additions in the form and detail thereof may be made without departing from the spirit and scope of the invention.

What is claimed is:

1. An apparatus for locating and positioning grid array features on a mating grid, comprising:

a mechanism configured to place said grid array features on said mating grid;

a vision system having an image acquisition device acquiring an image of a feature grid array;

a memory storing said image of said feature grid array and storing a model of said feature grid array;

a processor processing said image of said feature grid array to find at least two features to determine an estimated angle of rotation of said image of said feature grid array relative to said model, said processor processing said image to eliminate noise features and to correspond at least a portion of said at least two features on a grid in accordance with said model, said processor also determining a proper positioning of said grid relative to said model of said feature grid array and corresponding said at least a portion of said at least two features to features in said model, and said processor mapping found features in said image to model features in said model said mechanism receiving information from said processor as a function of said at least two features and said model to properly position said feature grid array on said mating grid.

2. The apparatus of claim 1 wherein said feature grid array is a ball grid array on a ball grid array electronic device, said mating grid is on an electronic assembly and wherein said vision system provides said mapping to a pick and place machine having a robotic mounter for manipulating said ball grid array for placement, in accordance with said mapping, onto said mating grid.

3. The apparatus of claim 1 wherein said processor further performs a least square fit as a fine alignment to refine position of said feature grid array relative to said mating grid.

4. An apparatus for locating and positioning grid array features on a mating grid, comprising:

a mechanism configured to place said grid array features on said mating grid;

a vision system having an image acquisition device acquiring an image of a feature grid array;

a memory storing said image of said feature grid array and storing a model of said feature grid array;

a processor processing said image of said feature grid array to find at least two features to determine an estimated angle of rotation of said image of said feature grid array relative to said model by generating a plurality of histograms representative of data points corresponding to lines of balls at multiple candidate angles from which the highest density peak projection is selected as indicative of said estimated angle, said processor processing said image to eliminate noise features and to correspond at least a portion of said at least two features on a grid in accordance with said model, said processor also determining a proper positioning of said grid relative to said model of said feature gird array and corresponding said at least a portion of said at least two features to features in said model, and said processor mapping of found features in said image to model features in said model;

said mechanism receiving information from said processor as a function of said at least two features and said model, to properly position said feature grid array on said mating grid.

5. The apparatus of claim 4 wherein said feature grid array is a ball grid array on a ball grid array electronic device, said mating grid is on an electronic assembly and wherein said vision system provides said mapping to a pick and place machine having a robotic mounter for manipulating said ball grid array for placement, in accordance with said mapping, onto said mating grid.

6. The apparatus of claim 4 wherein said processor further performs a least square fit as a fine alignment to refine position of said feature grid array relative to said mating grid.

* * * * *